United States Patent
Sunshine et al.

(10) Patent No.: US 10,761,605 B1
(45) Date of Patent: Sep. 1, 2020

(54) KNIT DATA INPUT GLOVE

(71) Applicant: Apple Inc., Cupertino, CA (US)

(72) Inventors: Daniel D. Sunshine, Sunnyvale, CA (US); Andrew L. Rosenberg, Sunnyvale, CA (US); Andrew Sterian, Morgan Hill, CA (US); Daniel A. Podhajny, San Jose, CA (US); Lia M. Uesato, San Jose, CA (US); Maurice P. May, Sunnyvale, CA (US); Steven J. Keating, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 15/940,844

(22) Filed: Mar. 29, 2018

Related U.S. Application Data (60) Provisional application No. 62/516,841, filed on Jun. 8, 2017.

(51) Int. Cl.
*G06F 3/14* (2006.01)
*G06F 3/01* (2006.01)
*A41D 19/00* (2006.01)

(52) U.S. Cl.
CPC .......... *G06F 3/014* (2013.01); *A41D 19/0024* (2013.01); *A41D 2500/10* (2013.01)

(58) Field of Classification Search
None
See application file for complete search history.

(56) References Cited

U.S. PATENT DOCUMENTS

| | | | |
|---|---|---|---|
| 5,047,952 A * | 9/1991 | Kramer | A61B 5/6806 341/20 |
| 5,143,505 A | 9/1992 | Burdea et al. | |
| 5,184,319 A * | 2/1993 | Kramer | G06F 3/011 345/156 |
| 5,280,265 A * | 1/1994 | Kramer | A61B 5/6806 128/925 |
| 6,128,004 A | 10/2000 | McDowall et al. | |
| 6,970,731 B1 * | 11/2005 | Jayaraman | A61B 5/0008 600/388 |
| 7,191,803 B2 | 3/2007 | Orr et al. | |
| 8,368,641 B2 | 2/2013 | Tremblay et al. | |
| 2003/0186607 A1 * | 10/2003 | Goldberg | A61N 1/36021 442/304 |
| 2005/0037844 A1 | 2/2005 | Shum et al. | |

(Continued)

*Primary Examiner* — Parul H Gupta
(74) *Attorney, Agent, or Firm* — Treyz Law Group, P.C.; G. Victor Treyz; Kendall W. Abbasi (57) ABSTRACT

An item such as a glove may be formed from knitted fabric. The knitted fabric may form fingers for the glove and may form pockets in the fingers. Sensors such as inertial measurement units may be placed in the pockets to measure movements of a user's fingers in the glove. The sensors may be coupled to control circuitry in the glove using conductive yarn in the knitted fabric. The conductive yarn may form courses in the knitted fabric that run along each finger. Haptic components and other electrical components may be coupled to the control circuitry using the conductive yarn. Electrodes may be formed from metal-coated strands of material in the fabric on the sides of each finger. The wireless or wired communications circuitry coupled to the control circuitry may be used to convey information such as user finger movement information to external equipment.

20 Claims, 7 Drawing Sheets

(56) References Cited

U.S. PATENT DOCUMENTS

| | | | | |
|---|---|---|---|---|
| 2006/0033387 A1* | 2/2006 | Wagner | .................... | H01H 1/12 |
| | | | | 310/15 |
| 2006/0264137 A1* | 11/2006 | Ishihara | .................... | D04B 1/24 |
| | | | | 442/304 |
| 2009/0018428 A1* | 1/2009 | Dias | .................... | A41D 13/1281 |
| | | | | 600/388 |
| 2011/0047672 A1* | 3/2011 | Hatfield | ............. | A41D 19/0024 |
| | | | | 2/163 |
| 2013/0180027 A1* | 7/2013 | Rock | ............... | A41D 19/01505 |
| | | | | 2/167 |
| 2014/0240214 A1* | 8/2014 | Liu | ......................... | G06F 3/014 |
| | | | | 345/156 |
| 2015/0250420 A1 | 9/2015 | Longinotti-Buitoni et al. | | |
| 2015/0366504 A1 | 12/2015 | Connor | | |
| 2016/0030835 A1 | 2/2016 | Argiro | | |
| 2017/0029985 A1* | 2/2017 | Tajitsu | ................. | D03D 1/0088 |
| 2017/0272842 A1* | 9/2017 | Touma | .................... | H04Q 9/00 |
| 2018/0347081 A1* | 12/2018 | Kurahashi | ............. | A41D 31/00 |
| 2019/0101983 A1* | 4/2019 | Cohen | .................... | A61F 2/583 |

* cited by examiner

KNIT DATA INPUT GLOVE

This application claims the benefit of provisional patent application No. 62/516,841, filed Jun. 8, 2017, which is hereby incorporated by reference herein in its entirety.

FIELD

This relates generally to fabric-based items and, more particularly, to fabric-based items such as gloves with electrical components.

BACKGROUND

It may be desirable for a user to control a system using data input gloves. For example, a user may manipulate virtual reality objects in a virtual reality system using data input gloves.

It can be challenging to incorporate electrical components into a fabric-based item such as gloves. As a result, it may be difficult to satisfactorily incorporate sensors and other components into data input gloves. Data input gloves may not be sufficiently comfortable when worn or may not be sufficiently accurate when used to control a system.

SUMMARY

An item such as a glove may be formed from knitted fabric. The knitted fabric may form fingers for the glove that have fabric pockets. Sensors such as inertial measurement units may be placed in the pockets to measure movements of a user's fingers in the glove. The sensors may be coupled to control circuitry in the glove with signal paths in the fabric.

The knitted fabric may include conductive yarn that forms the signal paths. The conductive yarn may form courses in the knitted fabric that run along each finger. Haptic components and other electrical components may be coupled to the control circuitry using the conductive yarn. Electrodes may be formed from metal-coated strands of material in the fabric on the sides of each finger. The control circuitry can use wireless or wired communications circuitry to convey information such as information on user finger movements to external equipment.

DETAILED DESCRIPTION

Figure 1:
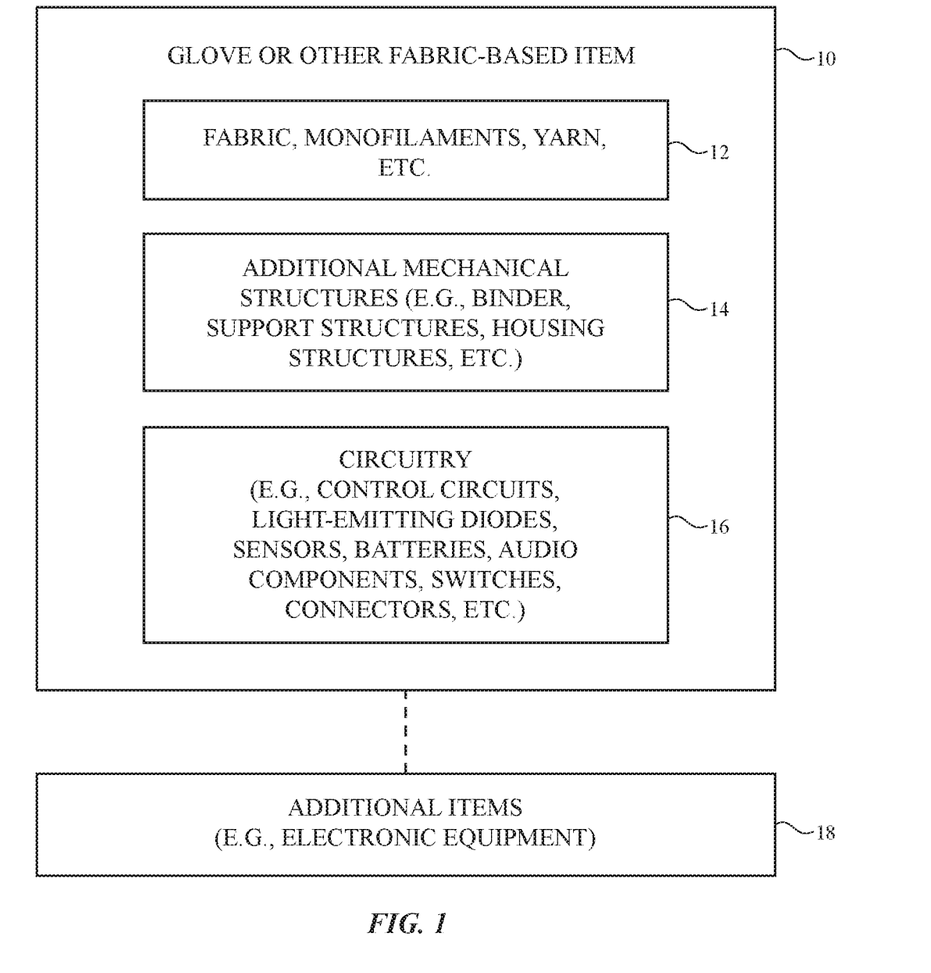
FIG. 1 is a schematic diagram of an illustrative fabric-based item such as a glove in accordance with an embodiment.

A data input glove such as glove 10 of FIG. 1 and/or other fabric-based item may include electrical components for sensing movement of a user (e.g., movements of a user's fingers) and/or for providing a user with feedback. In general, a fabric-based item may be an electronic device or an accessory for an electronic device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a remote control, a navigation device, an embedded system such as a kiosk, automobile, airplane, or other vehicle, other electronic equipment, a removable external case (cover) for electronic equipment, a strap, a wrist band, a head band, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, shirt, pants, shoes, gloves, etc.), or any other suitable fabric-based item. With one illustrative configuration, which is sometimes described herein as an example, the fabric-based item is a glove.

Items such as glove 10 may include intertwined strands of material (yarns) that form fabric 12. Fabric 12 may form all or part of a wall, an outer cover layer, an inner liner, or other layer in glove 10, may form internal structures such as pockets in glove 10, or may form other fabric-based structures. Glove 10 may be soft (e.g., glove 10 may have a fabric surface that yields to a light touch), may have a rigid feel (e.g., some or all of the surfaces of glove 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials.

The strands of material in fabric 12, which may sometimes be referred to herein as yarns, may be single-filament strands (sometimes referred to as fibers or monofilaments) or may be strands of material formed by intertwining multiple monofilaments of material together.

The yarns in fabric 12 may be formed from polymer, metal, glass, graphite, ceramic, natural materials such as cotton or bamboo, or other organic and/or inorganic materials and combinations of these materials. Conductive coatings such as metal coatings may be formed on non-conductive material. For example, plastic yarns in fabric 12 may be coated with metal to make them conductive. Reflective coatings such as metal coatings may be applied to make yarns reflective. Yarns may be formed from bare metal wires or metal wire intertwined with insulating monofilaments (as examples). Bare metal strands and strands of polymer covered with conductive coatings may be provided with insulating polymer jackets.

Yarn may be intertwined to form fabric 12 using intertwining equipment such as weaving equipment, knitting equipment, or braiding equipment. Intertwined yarn may, for example, form knitted fabric. Conductive yarn and insulating yarn may be woven, knit, braided, or otherwise intertwined to form contact pads that can be electrically coupled to conductive structures in glove 10 such as the contact pads of an electrical component.

Conductive yarn and insulating yarn may also be woven, knit, or otherwise intertwined to form conductive paths. The conductive paths may be used in forming signal paths (e.g., signal buses, power lines, etc.), may be used in forming part of a capacitive touch sensor electrode, a resistive touch sensor electrode, or other input-output device, or may be used in forming other patterned conductive structures. Conductive structures in fabric 12 such as signal paths formed from conductive yarn may be used in carrying power signals, digital signals, analog signals, sensor signals, control signals, data, input signals, output signals, or other suitable electrical signals.

Glove 10 may include additional mechanical structures 14 such as polymer binder to hold yarns in fabric 12 together and to support structures such as frame members, housing structures (e.g., an electronic device housing), and other mechanical structures.

Circuitry 16 may be included in item 10. Circuitry 16 may include electrical components that are coupled to fabric 12, electrical components that are housed within an enclosure formed by fabric 12, and electrical components that are attached to fabric 12 using welds, solder joints, conductive adhesive bonds, crimped connections, or other electrical and/or mechanical bonds. Circuitry 16 may include metal structures for carrying current, electrical components such as integrated circuits, light-emitting diodes, sensors, haptic devices, light-emitting devices, and other electrical devices. Control circuitry in circuitry 16 may be used to control the operation of glove 10.

Glove 10 may interact with electronic equipment or other additional items 18. Items 18 may be attached to glove 10 (e.g., with a cable that conveys data and/or power between item 18 and glove 10) or glove 10 and item 18 may be separate items that are configured to communicate with each other wirelessly. For example, item 18 may be a computer, cellular telephone, or other electronic device that wirelessly communicates with glove 10 to receive user input from glove 10 (e.g., information on user finger movements and/or hand position information) and/or to provide feedback to a user with glove 10.

Control circuitry in circuitry 16 may be used to support communications with item 18 and/or other devices. Circuitry 16 may support wireless communications with item 18. For example, circuitry 16 may have wireless circuitry such as antennas and radio-frequency transceiver circuitry (e.g., receivers and transmitters) that transmits and receives data wirelessly using the antennas. If desired, circuitry 16 may include Bluetooth® circuitry and/or WiFi® circuitry or other wireless local area network circuitry, cellular telephone circuitry, or other wireless communications circuitry. Item 18 may be an electronic device such as a cellular telephone, computer, or other portable electronic device and glove 10 may be tethered to item 18 with a wire and/or may wirelessly communicate with item 18. If desired, glove 10 may include fabric 12 and item 18 may be an accessory or other device that interacts with glove 10 using signal paths formed from conductive yarns in fabric 12. In this configuration, the conductive yarns may be used to route signals between circuits in glove 10 and may, if desired, be used in routing signals between glove 10 and item 18.

The fabric that makes up glove 10 may be formed from multifilament and/or monofilament yarns (strands) that are intertwined using any suitable intertwining equipment. With one suitable arrangement, which may sometimes be described herein as an example, fabric 12 may be knitted fabric formed using a knitting machine (e.g., fabric 12 may have a Jersey knit). Configurations in which some or all of the fabric for glove 10 is formed using braiding, weaving, or other strand intertwining technique may also be used.

Figure 2:
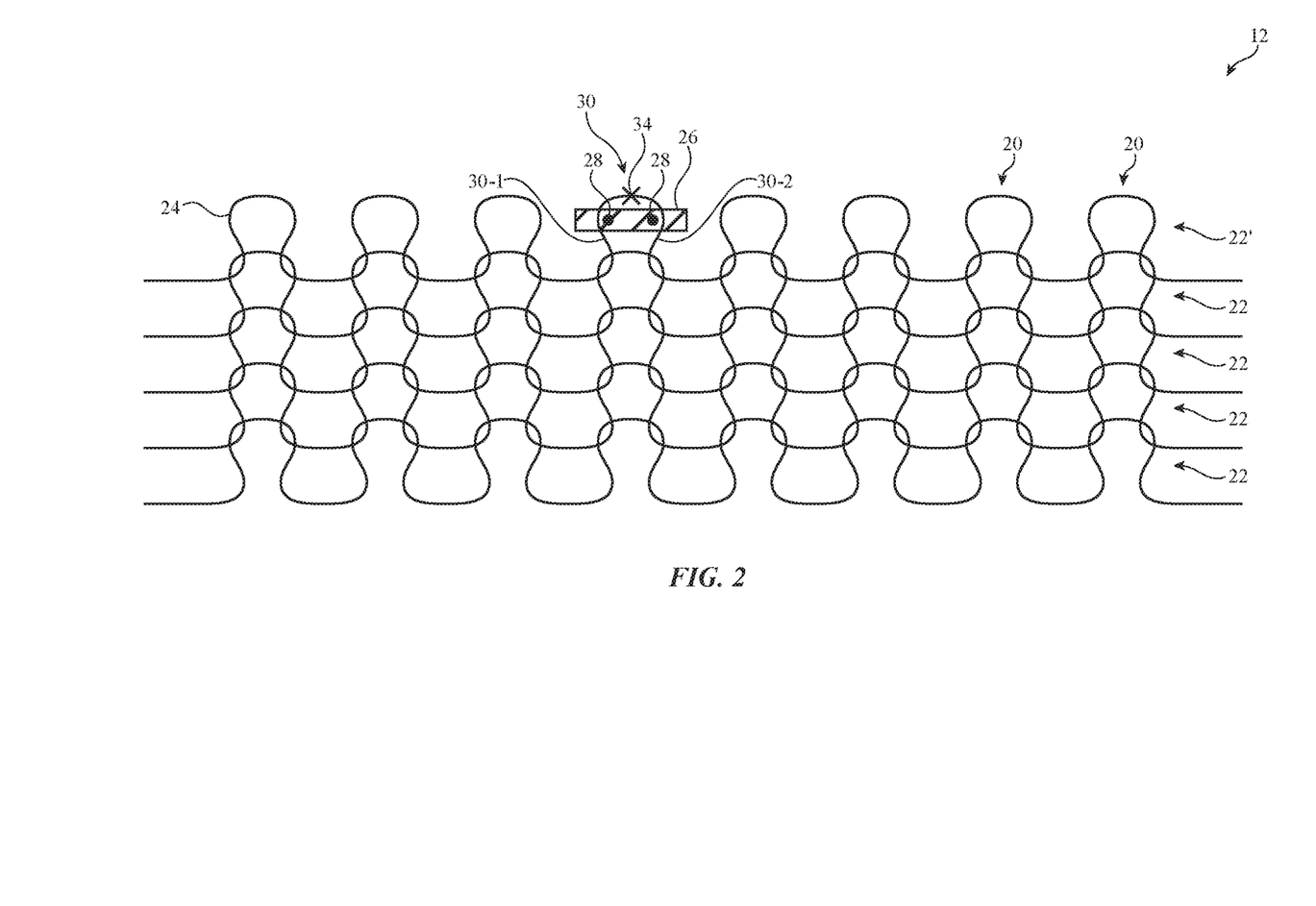
FIG. 2 is a diagram of illustrative knit fabric with an embedded electrical component in accordance with an embodiment.

A top view of illustrative knitted fabric 12 is shown in FIG. 2. In the illustrative configuration of FIG. 2, fabric 12 has a single layer of knitted yarns 24. Other fabric constructions may be used for fabric 12 if desired (e.g., fabrics with multiple layers, etc.).

As shown in FIG. 2, fabric 12 may include yarns 24 or other strands of material that form horizontally extending rows of interlocking loops (courses 22) and vertically extending wales 20. Some or all of yarns 24 in fabric 12 such as yarn 24 in course 22' in the example of FIG. 2 may be conductive.

Loops of conductive yarn in fabric 12 may be provided with electrical components such as illustrative component 26. Components in fabric 12 such as component 26 may be light-based components (e.g., light-emitting diodes, displays, and/or light detectors), may be sensors that sense temperature, pressure, force, capacitance, touch, magnetic field strength, motion (e.g., accelerometers, gyroscopes, compasses, inertial measurement units, etc.), other suitable sensors, integrated circuits with sensors and/or light-based components, integrated circuits with communications circuitry and/or control circuitry, force-feedback devices and other haptic devices (e.g., piezoelectric devices, shape memory devices that exhibit stress when heated, electromagnetic actuators, etc.), heaters (e.g., Peltier effect heaters, ohmic heating elements, etc.), power harvesting components (e.g., heat-based power harvesting devices, power harvesting devices based on electromagnetic generators, electrostatic charge power harvesting devices such as triboelectric generators that harvest energy based on the triboelectric effect, power storage devices such as batteries and capacitors, temperature sensors, displays batteries, capacitors, and other power storage, piezoelectric haptic and/or other electrical devices.

Components such as component 26 may have any suitable number of terminals. For example, component 26 may have a pair of terminals such as terminals 28. Component 26 may be mounted to yarn loop 30 so that a first of terminals 28 is electrically shorted to yarn loop portion 30-1 and a second of terminals 28 is electrically shorted to yarn loop portion 30-2. For example, solder or other conductive material may be used to couple terminals 28 to metal in yarn portions 30-1 and 30-1.

The metal or other conductive material of yarn 24 in course 22' may be selectively removed in the vicinity of component 26 between portions 30-1 and 30-2 to create an open circuit such as open circuit 34 (e.g., by severing loop 30, by exposing the metal to etchant, by laser processing, etc.). In the presence of open circuit 34, signals can pass through component 26 (i.e., signals can pass from one terminal of component 26 to the other), but will not pass through the portion of loop 30 that extends between yarn loop portion 30-1 and yarn loop portion 30-2. The formation of open circuit 34 therefore ensures that terminals 28 will not be shorted to each other by yarn 24 and allows component 26 to operate satisfactorily. Control circuitry in circuitry 16 (FIG. 1) may be used in controlling the application of signals to component 26. These signals may be conveyed using yarn 24 (e.g., one or more conductive courses 22 of yarn 24). Conductive courses 22 of yarn 24 may extend along the longitudinal axis of each finger in glove 10 and stretch during use of glove 10 without stressing internal conductive strands.

Figure 3:
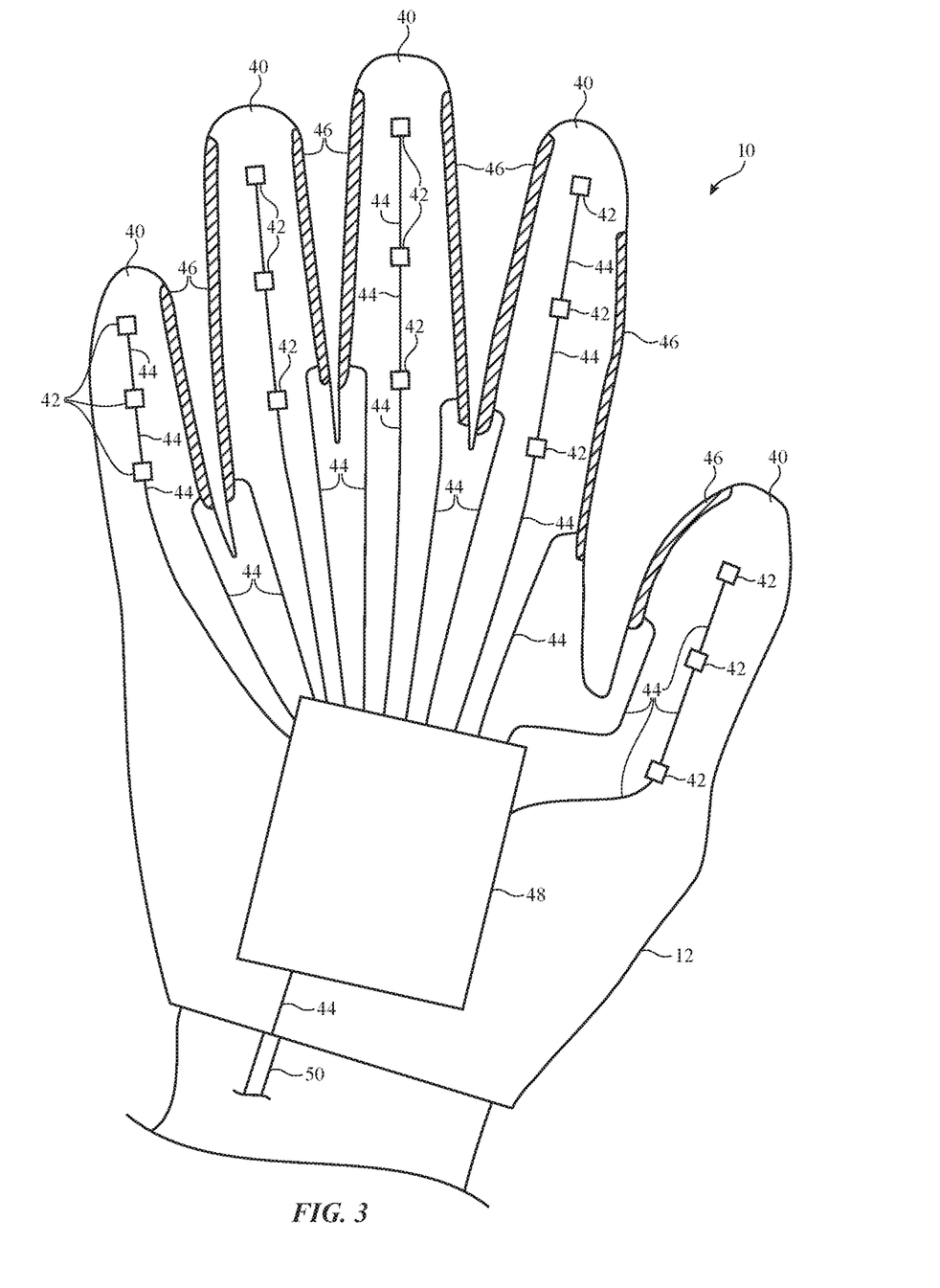
FIG. 3 is a top view of an illustrative glove in accordance with an embodiment.

FIG. 3 is a top view of glove 10 in an illustrative configuration in which electrical components such as sensors and other components have been incorporated into glove 10. As shown in FIG. 10, glove 10 may be formed from fabric 12 (e.g., knit fabric). Fabric 12 may be knit to form glove fingers 40. For example, fingers 40 may be knit with smoothly tapered cross-sectional areas and/or other suitable finger shapes (e.g., shapes with desired lengths, widths, and finger tapers). To interconnect circuitry in glove 10, some of the yarns used in forming glove 10 may be conductive.

Electrical components such as components 42, electrodes 46, and circuitry 48 may be incorporated into glove 10. Components 42 may include devices such as component 26 of FIG. 2 and/or the components of circuitry 16 of FIG. 1 or other devices). For example, components 42 may be inertial measurement units that are configured to measure the behavior of the user's fingers. Inertial measurement units may include, for example, accelerometers that measure the orientation of the Earth's gravitational field and that can therefore measure the orientation and motion of a user's fingers in glove fingers 40, may include gyroscopes (gyroscopic sensors) that measure motion of the user's fingers in glove fingers 40 (e.g., angular motion), and/or sensors such as compasses (e.g., magnetic sensors, sometimes referred to as magnetometers) that measure orientation and that can therefore measure finger movement. Inertial measurement units (e.g., microelectromechanical systems sensors) that include 3-axis accelerometer sensors, 3-axis gyroscopes, and 3-axis compasses may sometimes be referred to as nine axis inertial measurement units. Circuitry 48 may include control circuitry such as integrated circuit(s), additional inertial measurement units, and/or other circuitry (e.g., circuitry 16 of FIG. 1). Wireless components (e.g., antennas, transceivers, etc.) may be used in circuitry 48 to transmit and receive data for glove 10. Data may also be conveyed over paths such as cable 50.

Electrodes 46 may be formed from conductive structures (e.g., wires, metal fabric coatings layers, metal structures formed from strands of material such as pads formed from silver-coated polyamide strands or other metal-coated polymer strands, plated metal, and/or sheets of metal, and/or yarns 24 that are formed from conductive material). During operation of glove 10, it may occasionally be desirable to gather information on the absolute position of fingers 40. With one illustrative configuration, circuitry 48 (e.g., control circuitry 16) can measure signals from electrodes 46 (e.g., resistances or capacitances between adjacent pairs of electrodes). Based on this information (e.g., information indicating that each of electrodes 46 on the side of a respective finger 40 has been shorted to an adjacent electrode 46 on an adjacent finger), the control circuitry can confirm that each of the fingers 40 of glove 10 is adjacent to the next and, by thus knowing the relative locations of all of fingers 40 (e.g., by determining that all fingers 40 are parallel to each other) can determine the absolute position of fingers 40 with respect to each other. This information can be used to better estimate the absolute position of fingers 40, because inertial measurement units do not provide absolute position information. Electrodes 46 and/or other electrodes in glove 10 (e.g., electrodes on interior portions of glove 10 that contact a user's hand) may be used to apply electrical stimulation to a user's muscles and/or may be used to measure skin moisture or other hand characteristics.

Signal paths 44 may be used in coupling circuitry in glove 10 together. For example, signal paths 44 may be used to carry signals between components 42 and circuitry 48, between electrodes 46 and circuitry 48, and/or between circuitry 48 and cable 50 (as examples). In the illustrative configuration of FIG. 3, a series of components 42 (e.g., three components, at least two components, at least three components, fewer than ten components, or other suitable number of components) extend along the length (the longitudinal axis) of each finger 40. Paths 44 therefore extend along the length of each finger 40 to carry signals between these components and circuitry 48. In configurations in which some or all of the signal lines in paths 44 are formed from conductive yarn 24, it may be desirable for courses 22 in fabric 12 (including courses that contain the conductive yarn such as course 22' of FIG. 2) to run along the lengths of fingers 40. This allows single conductive yarns to carry signals between circuitry 48 and components located at more distant locations along the length of fingers 40.

Illustrative configurations for yarn 24 and the strands of material that form yarn 24 are shown in FIGS. 4, 5, 6, 7, and 8.

Figure 4:
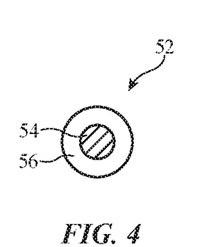
FIGS. 4, 5, and 6 are cross-sectional views of illustrative conductive strands in accordance with an embodiment.
Figure 5:
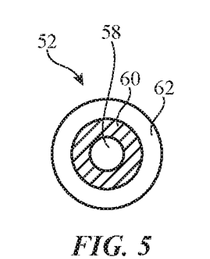
Figure 6:
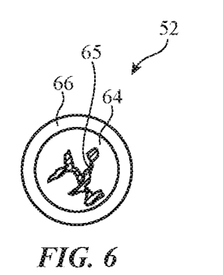

Conductive yarn may be formed from conductive strands of materials (e.g., wires, conductive polymer strands, etc.). A cross-sectional side view of an illustrative conductive strand is shown in FIG. 4. In the example of FIG. 4, conductive strand 52 has a conductive core (core 54) and an optional insulating coating (insulating coating 56). Conductive strands such as strand 52 may, as an example, have metal cores of about 25 microns in diameter, diameters of 5-75 microns, at least 10 microns in diameter, fewer than 50 microns in diameter, etc. Core 54 may be formed from copper, a copper alloy, or other metal and insulating coating 56 may be formed from polymer (as examples). In the example of FIG. 5, core 58 of strand 52 has been formed of an insulating material (e.g., a polymer), coating layer 60 on core 58 has been formed from a conductive material (e.g., copper, a copper alloy, or other metal), and optional outer insulating coating 62 has been formed from a material such as polymer. FIG. 6 shows how core 64 of strand 52 may include conductive particles 65 (e.g., metal flakes, graphite flakes, graphene, conductive nanoparticles, or other conductive particles in a polymer binder) and how this core may be coated with an optional polymer coating (coating 66). If desired, insulating strands may be formed by replacing conductive material in strands 52 of FIGS. 4, 5, and/or 6 with polymer or other insulating material.

Figure 7:
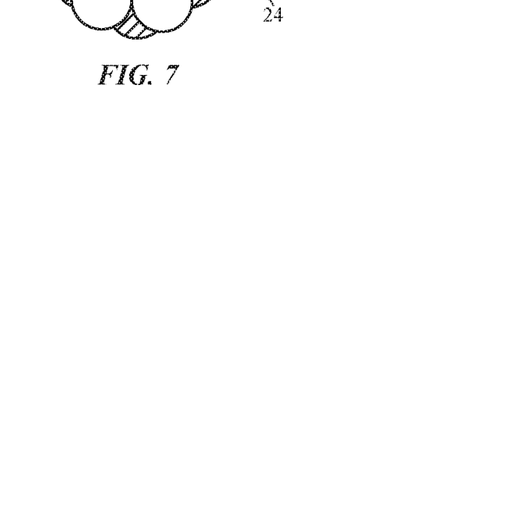
FIG. 7 is a cross-sectional view of illustrative conductive yarn formed from multiple intertwined conductive strands in accordance with an embodiment.

FIG. 7 shows how multiple strands 52 (e.g., multiple conductive strands 52) may be joined to form yarn 24. Adhesive (e.g., polymer) such as adhesive 68 may be used to help join strands 52 to each other and thereby enhance the overall strength of yarn 24. There may be any suitable number of strands 52 in yarn 24 (e.g., at least 2, at least 4, 6, at least 6, 7, at least 7, 8, at least 8, fewer than 10, fewer than 20, etc.).

Figure 8:
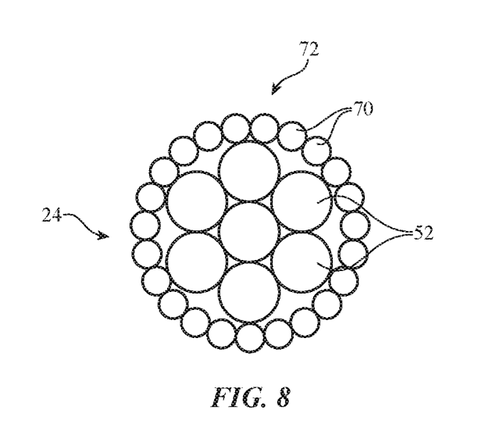
FIG. 8 is a cross-sectional view of illustrative conductive yarn surrounded with a braided insulating jacket in accordance with an embodiment.

Yarn 24 may be insulated by virtue of the insulating coatings on strands 52 and/or yarn 24 may be insulated and/or protected by adding a protective jacket that surround strands 52. For example, strands 52 of FIG. 7 may be surrounded by a solid polymer jacket or, as shown in FIG. 8, may be surrounded by a braided jacket such as braided jacket 72 formed from insulating strands 70 (e.g., monofilaments). Insulating strands 70 may be formed from polymer (e.g., polyethylene terephthalate monofilaments) or other dielectric material. Braided jacket 72 may contain at least 3 strands 70, at least 5 strands 70, 6 strands 70, at least 6 strands 7, at least 8 strands 70, fewer than 10 strands 70.

Figure 9:
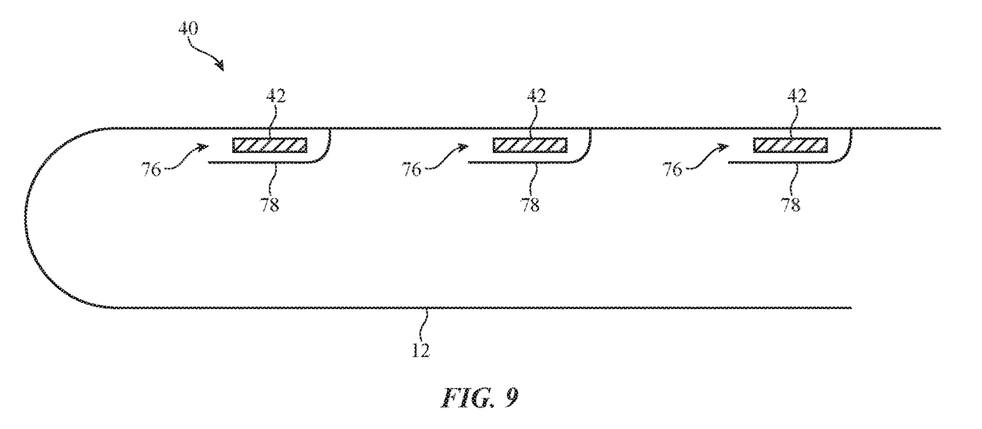
FIG. 9 is a cross-sectional side view of an illustrative glove finger in accordance with an embodiment.

A cross-sectional side view of an illustrative glove finger taken along the length of the glove finger and viewed from the side of the glove finger is shown in FIG. 9. As shown in FIG. 9, electrical components such as components 42 may be mounted in pockets 76 formed from flaps of fabric 12 such as fabric flaps 78. Pockets 76 may have openings that face towards the tip of the glove finger so that pockets 76 do not catch on the user's fingernail. By forming pockets 76 on the interior surface of fabric 12, pockets 76 may be hidden from view. If desired, other configurations may be used for pockets 76 (e.g., one or more pockets may be formed from flaps on the exterior of glove 10, etc.). Circuitry 48 may include one or more substrates (e.g., one or more printed circuits populated with components) and may be mounted in one or more pockets, may be embedded within fabric 12, and/or may be mounted in glove 10 using other arrangements.

Figure 10:
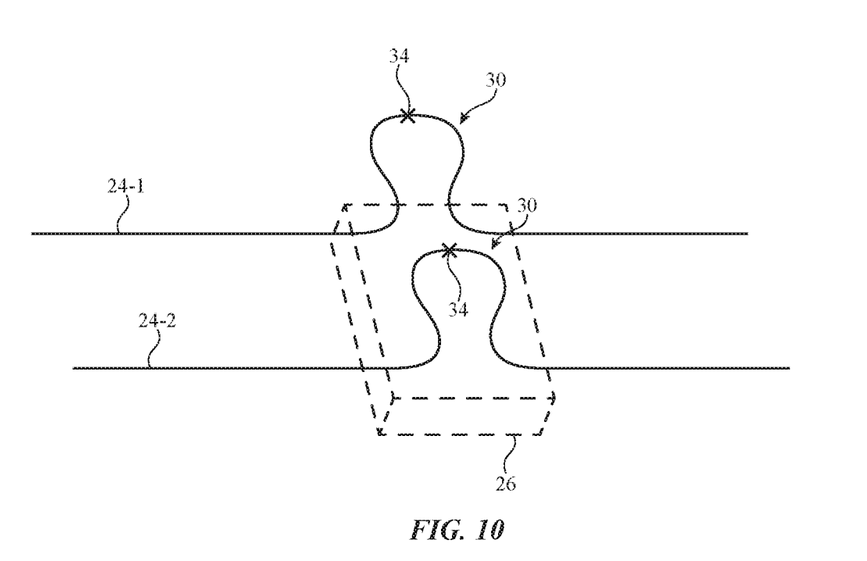
FIG. 10 is a perspective view of an illustrative electrical component of the type that may be connected to conductive strands in a knit fabric in accordance with an embodiment.
Figure 11:
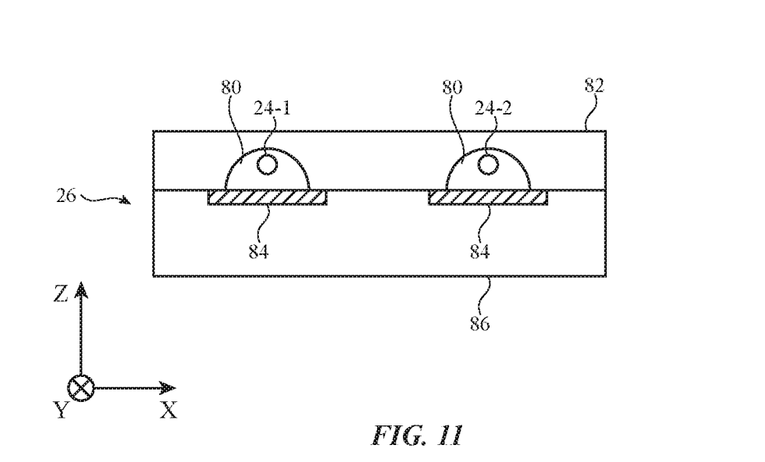
FIG. 11 is a cross-sectional side view of the illustrative electrical component of FIG. 10 following electrical connection of the component to conductive strands in accordance with an embodiment.

FIGS. 10 and 11 illustrate how electrical components (e.g., illustrative component 26, which may be one of components 42 of FIG. 9 and/or other circuitry 16) may be electrically coupled to signal paths formed from conductive yarns. In the example of FIG. 10, two conductive strands of material: conductive yarn 24-1 and conductive yarn 24-2 overlap component 26. Other numbers of conductive yarns may overlap component 26 and be coupled to component 26, if desired. For example, four or more yarns 24 may extend past component 26 (e.g., two carrying data and two carrying power, etc.). Open circuits 34 may be formed in respective loops 30 of yarns 24-1 and 24-2. This allows each of the four resulting ends of yarn at component 26 to be coupled to four respective contacts on components 26. Conductive adhesive, solder, or other conductive material may be used in coupling the conductive yarn to the contacts on component 26.

With one illustrative configuration, which is shown in the cross-sectional side view of component 26 of FIG. 11, solder joints may be formed in which solder 80 couples yarns such as yarn 24-1 and yarn 24-2 to contacts (terminals) 84. During the formation of the solder connections at contacts 84, yarns 24-1 and 24-2 may penetrate through polymer layer 82, which can help retain yarns 24-1 and 24-2 on component 26. If desired, retention structures such as polymer layer 82 or other structures for protecting solder joints may be formed on top of the solder joints formed at contacts 84 after yarn 24-1 and yarn 24-2 are soldered to contacts 84.

Figure 12:
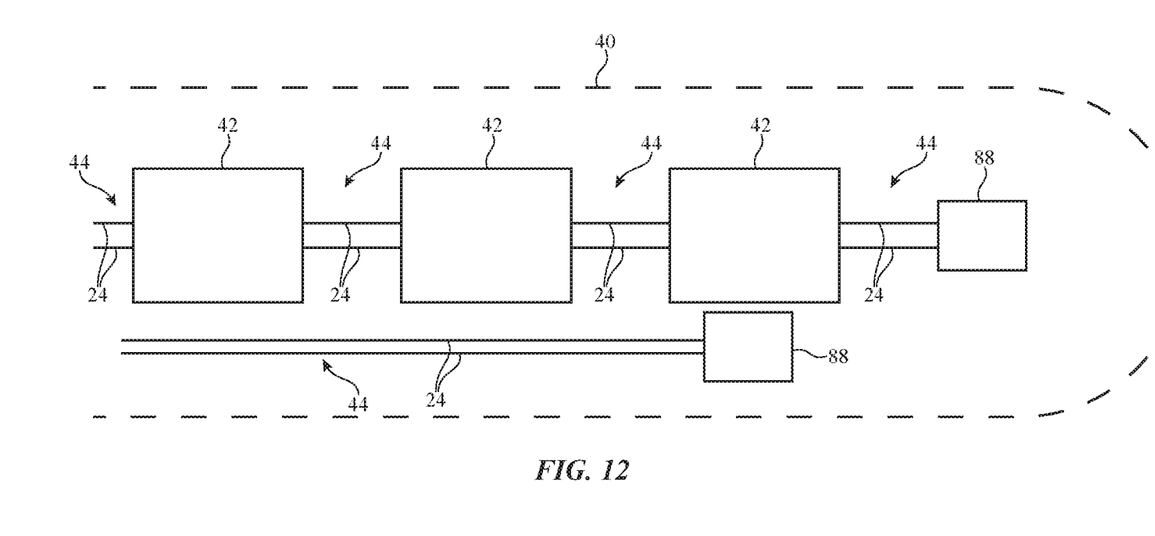
FIG. 12 is a diagram of an illustrative set of components that are interconnected using conductive signal paths such as paths formed from conductive yarn in a knit fabric in accordance with an embodiment.

FIG. 12 is a side view of an illustrative finger 40 in glove 10 showing how components 42 may receive signals from signal paths 44. A unique signal path may run between circuitry 48 and each electrical component mounted elsewhere in glove 10 (e.g., a unique path 44 may be used in coupling circuitry 48 to each of components 42 and to each of electrodes 46) or, as shown in FIG. 12, a set of multiple components 42 may be coupled together by respective path segments (e.g., paths 44 may be used to link together multiple components 42 in series). When components 42 are linked together using a series of corresponding path segments, the total wiring in glove 10 may be reduced. Each component 42 in this type of configuration may have circuitry for receiving and transmitting signals over each of the paths 44 that are coupled to that component 42. Some signals that are received by a given component 42 will be destined to that component, whereas other signals that are received by a given component 42 are destined for other circuitry (e.g., another component 42 in the chain of components running along finger 40 of glove 10).

If desired, paths 44 may be used to couple circuitry 48 to additional components such as components 88. Components 88 may include the components of circuitry 16 of FIG. 1 and/or components 26. With one illustrative configuration, components 88 may include haptic components for providing a user of glove 10 with force feedback. Components 88 may be coupled to control circuitry 48 using dedicated paths 44 (e.g., a path that runs directly from component 88 to circuitry 48). This type of interconnection arrangement may be suitable for situations in which components 88 are operated with relatively large amounts of peak current (as an example). Configurations in which components 88 are chained together in series with components 42 may also be used. To provide satisfactory haptic feedback to a user of glove 10, a haptic component (e.g., component 88) may be placed under each component 42 (e.g., on the bottom or top of each glove finger 40), and/or may be placed at locations near the tip of finger 40 (e.g., under or over a user's fingertip, and/or in portions of glove finger 40 that surround some or all of a fingertip) or other suitable locations in glove 10.

The electrical components of glove 10 may include inertial measurement units, haptic components, light-emitting diodes (e.g., a light-emitting diode or an array of 2-10 light-emitting diodes mounted on the back of glove 10 or other portion of glove 10 that emit light that is detected by cameras in a motion capture system that monitors user hand positions), heart rate sensors, humidity sensors, moisture (conductivity) sensors, force sensors, strain gauges, temperature sensors, thermochromic dye devices that change color in response to changes in temperature, a display such as an organic light-emitting diode display, a display with an array of pixels formed from respective light-emitting diode dies, a pixel array formed from liquid crystal display components, and/or other display devices, a power generating device that generates power from heat differences, mechanical movement, or electrostatic effects (e.g., triboelectric effects), a battery or a capacitor for storing energy, other sensors such as health, optical, and/or environmental sensors, actuators for providing haptic feedback, haptic feedback devices based on piezoelectric components and/or ohmically heated shape memory metal structures, Peltier effect devices that generate heat and/or that perform cooling, components based on nanoparticles (e.g., displays and other output devices based on Janus particles), plastic and/or metal structures that change their stiffness in response to application of heat (e.g., a polymer or shape memory structure that makes a portion of glove 10 stiff and that can dynamically be rendered less stiff by application of heat from an ohmic heating element, Peltier effect heater, or other heating device), wireless components to transmit data to glove 10 (e.g., to control haptic devices and/or other components that supply output to a user and/or that adjust the properties of glove 10, to convey sensor data from inertial measurement units and/or other sensors in glove 10 to a computer or other external equipment), and/or other circuitry for glove 10.

The foregoing is merely illustrative and various modifications can be made to the described embodiments. The foregoing embodiments may be implemented individually or in any combination.

What is claimed is:

1. A glove comprising:
   knit fabric configured to form fingers, wherein the knit fabric includes courses and wales and wherein each finger includes a conductive course that spans a length of the finger and that is formed from a conductive yarn; and sensors located along each finger that are coupled to the conductive yarn of that finger, wherein the glove has an exterior surface and wherein the knit fabric separates the sensors from the exterior surface of the glove.

2. The glove defined in claim 1 wherein the sensors comprise inertial measurement units, the glove further comprising:

control circuitry coupled to each of the inertial measurement units by the conductive yarn; and a haptic device on one of the fingers, wherein the haptic device is coupled to the control circuitry by an additional conductive yarn in the fabric.

3. The glove defined in claim 2 further comprising metal-coated polymer strands in the knit fabric that form electrodes on sides of the fingers, wherein the metal-coated polymer strands are electrically coupled to the control circuitry.

4. The glove defined in claim 1 wherein the sensors comprise nine axis inertial measurement units.

5. The glove defined in claim 1 wherein the conductive yarn has conductive strands each of which has a conductive core with an insulating coating.

6. The glove defined in claim 5 wherein the conductive core comprises copper.

7. The glove defined in claim 6 wherein the conductive yarn has an insulating jacket surrounding at least five of the conductive strands.

8. The glove defined in claim 7 wherein the insulating jacket comprises braided polymer strands.

9. The glove defined in claim 1 wherein the sensors comprise magnetometers.

10. The glove defined in claim 1 wherein the sensors include accelerometers and gyroscopes.

11. The glove defined in claim 1 wherein the sensors comprise inertial measurement units.

12. The glove defined in claim 1 wherein the sensors comprise nine axis inertial measurement units, the glove further comprising:

control circuitry coupled to each of the sensors by the conductive yarn; and a haptic device on one of the fingers, wherein the haptic device is coupled to the control circuitry by an additional conductive yarn in the fabric.

13. The glove defined in claim 1 further comprising wireless communications circuitry that is configured to wirelessly communicate with external equipment.

14. The glove defined in claim 1 further comprising:
electrodes formed from conductive strands in the yarn,
light-emitting diodes that emit light; and
wireless communications circuitry.

15. A fabric-based item, comprising:

knit fabric including conductive yarn with strands of insulated wire surrounded by a braided insulating jacket formed from polymer strands, wherein the conductive yarn comprises a conductive course;

inertial measurement units that each respectively measure movement of a different portion of the knit fabric;

control circuitry coupled to the inertial measurement units with the conductive yarn;

haptic devices coupled to the control circuitry with the conductive yarn;

electrodes formed from metal-coated polymer strands in the knit fabric; and wireless communications circuitry coupled to the control circuitry.

16. The fabric-based item defined in claim 15 further comprising:

an electrical component coupled to the control circuitry, wherein the electrical component comprises a component selected from the group consisting of: a heart rate sensor, a moisture sensor, a force sensor, and a temperature sensor.

17. A glove, comprising:

knit fabric configured to form fingers, wherein the knit fabric comprises multiple fabric pockets located along each of the fingers;

sensors in each of the fabric pockets;

a course in the knit fabric of each finger having a conductive yarn that extends along the finger; and control circuitry that is electrically connected to the sensors in the fabric pockets using the conductive yarn in the course in each finger.

18. The glove defined in claim 17 wherein the sensors comprise inertial measurement units, wherein the conductive yarn includes multiple strands of insulated wire, and wherein the glove further comprises light-emitting diodes.

19. The glove defined in claim 18 further comprising metal-coated strands configured to form electrodes in the knit fabric.

20. The glove defined in claim 19 wherein the fingers each have sides and wherein the electrodes form conductive pads on the sides.

* * * * *